(12) United States Patent
Licamara

(10) Patent No.: US 11,463,662 B2
(45) Date of Patent: Oct. 4, 2022

(54) SCHOOL SECURITY ASSEMBLY

(71) Applicant: Robert Licamara, Wayne, NJ (US)

(72) Inventor: Robert Licamara, Wayne, NJ (US)

( * ) Notice: Subject to any disclaimer, the term of this patent is extended or adjusted under 35 U.S.C. 154(b) by 48 days.

(21) Appl. No.: 16/936,495

(22) Filed: Jul. 23, 2020

(65) Prior Publication Data

US 2022/0030200 A1 Jan. 27, 2022

(51) Int. Cl.
*H04N 7/18* (2006.01)
*G08B 3/10* (2006.01)
*H04N 5/225* (2006.01)
*H04R 1/02* (2006.01)
*H04R 1/08* (2006.01)

(52) U.S. Cl.
CPC ........... *H04N 7/183* (2013.01); *G08B 3/1008* (2013.01); *H04N 5/2253* (2013.01); *H04R 1/028* (2013.01); *H04R 1/08* (2013.01)

(58) Field of Classification Search
CPC .... H04N 7/183; H04N 5/2253; G08B 3/1008; H04R 1/028; H04R 1/08
See application file for complete search history.

(56) References Cited

U.S. PATENT DOCUMENTS

| | | | |
|---|---|---|---|
| 6,967,575 B1 | 11/2005 | Dohrmann | |
| 7,232,056 B1* | 6/2007 | Jackson | A47G 29/121 232/35 |
| 9,327,887 B2 | 5/2016 | Farentinos | |
| 10,037,636 B2 | 7/2018 | Ho | |
| 10,292,519 B1* | 5/2019 | Sutton | A47G 29/16 |
| 2014/0014008 A1* | 1/2014 | Tompkins | E05G 1/02 109/23 |
| 2018/0343141 A1 | 11/2018 | Scalisi | |
| 2019/0130689 A1 | 5/2019 | Baumgarte | |
| 2019/0277552 A1* | 9/2019 | Vu | F25D 23/025 |
| 2020/0012245 A1 | 1/2020 | Marin Pulido | |
| 2020/0281387 A1* | 9/2020 | Poss | A47G 29/20 |
| 2021/0022536 A1* | 1/2021 | Anderson | G06Q 10/0832 |
| 2021/0059456 A1* | 3/2021 | Fontanilla | A47G 29/16 |
| 2021/0251409 A1* | 8/2021 | Kennett | A47G 29/141 |

FOREIGN PATENT DOCUMENTS

| | | | | |
|---|---|---|---|---|
| GB | 2569771 A | * | 7/2019 | ......... A47G 29/1248 |
| WO | WO2019178152 | | 9/2019 | |

* cited by examiner

*Primary Examiner* — Richard A Hansell, Jr.

(57) ABSTRACT

A school security assembly for preserving security of a public building includes a drop box that is positionable adjacent to an entrance of a public building for receiving an object to be delivered to a recipient inside the public building. A communication unit is positioned adjacent to the drop box and the communication unit is in communication with the person when the person approaches the drop box. The communication unit is in communication with a surveillance station in the public building to facilitate the person to communicate with an authorized representative in the public building.

11 Claims, 8 Drawing Sheets

SCHOOL SECURITY ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to security devices and more particularly pertains to a new security device for preserving security of a public building.

(2) Description of Related Art Including Information Disclosed Under 37 CFR 1.97 and 1.98

The prior art relates to security devices including a variety of drop box devices that are lockable and which can be unlocked with a variety of pre-determined security means for storing an object for an authorized recipient. The prior art discloses a method for controlling access to a secured area. The prior art discloses an electronic doorbell device that is in communication with a personal electronic device. The prior art discloses a method of securely storing a package for an authorized recipient.

BRIEF SUMMARY OF THE INVENTION

An embodiment of the disclosure meets the needs presented above by generally comprising a drop box that is positionable adjacent to an entrance of a public building for receiving an object to be delivered to a recipient inside the public building. A communication unit is positioned adjacent to the drop box and the communication unit is in communication with the person when the person approaches the drop box. The communication unit is in communication with a surveillance station in the public building to facilitate the person to communicate with an authorized representative in the public building.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
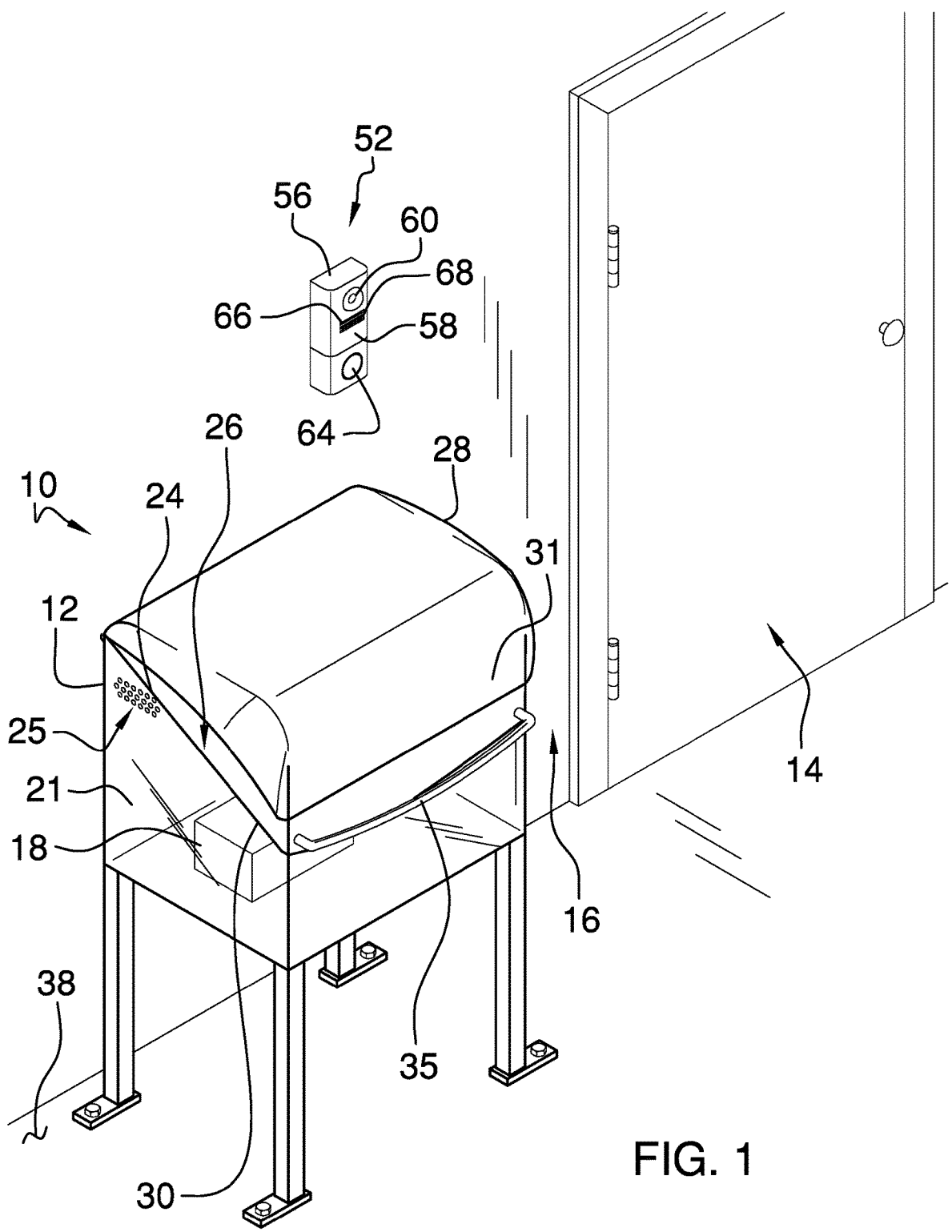
FIG. 1 is a perspective view of a school security assembly according to an embodiment of the disclosure.
Figure 2:
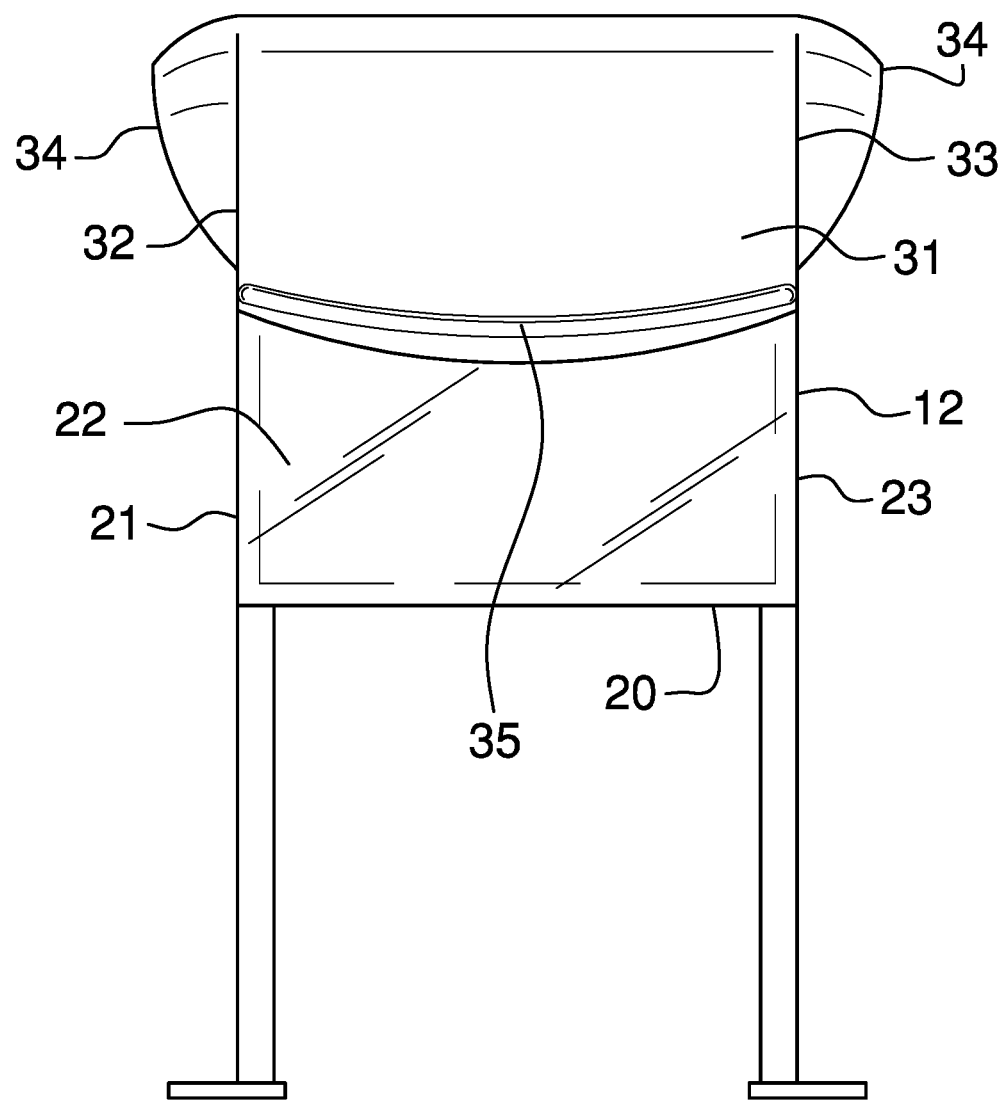
FIG. 2 is a front view of drop box of an embodiment of the disclosure.
Figure 3:
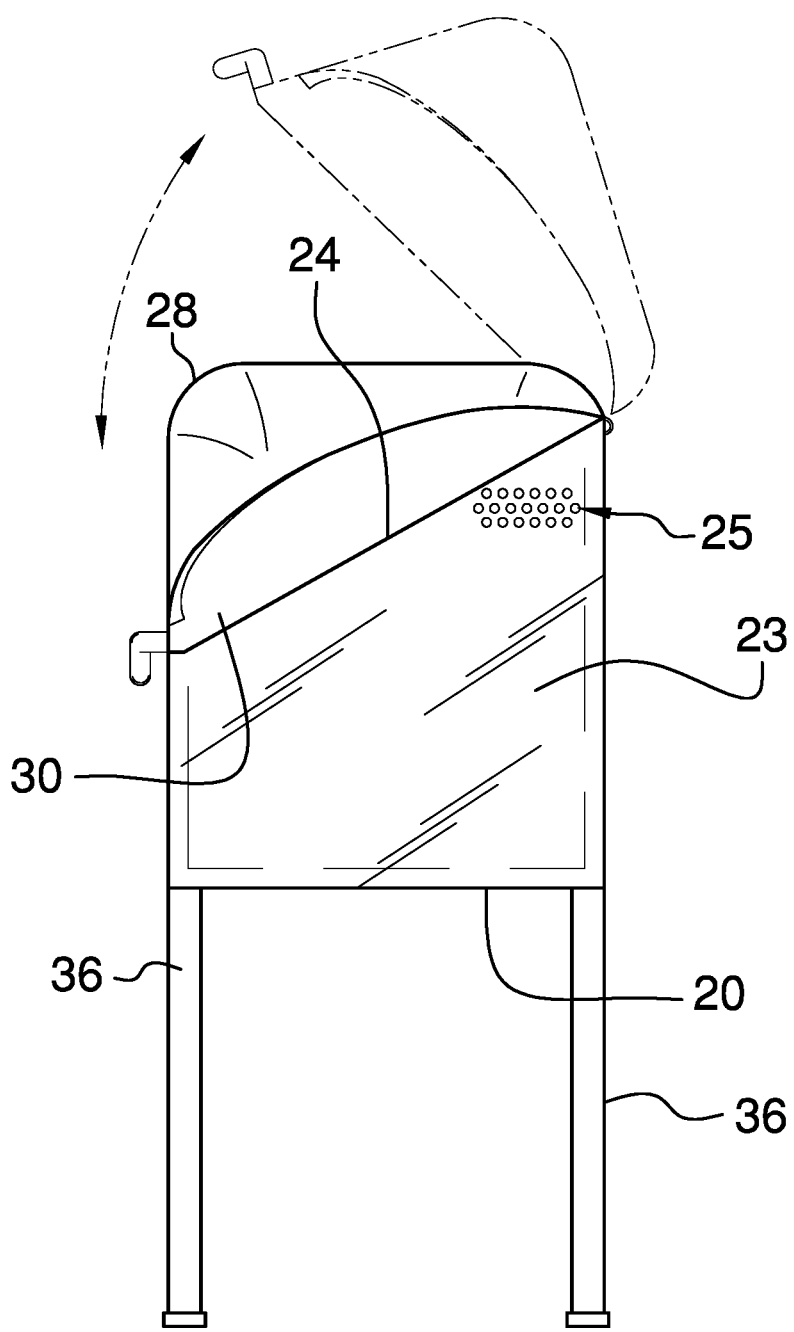
FIG. 3 is a left side view of a drop box of an embodiment of the disclosure.
Figure 4:
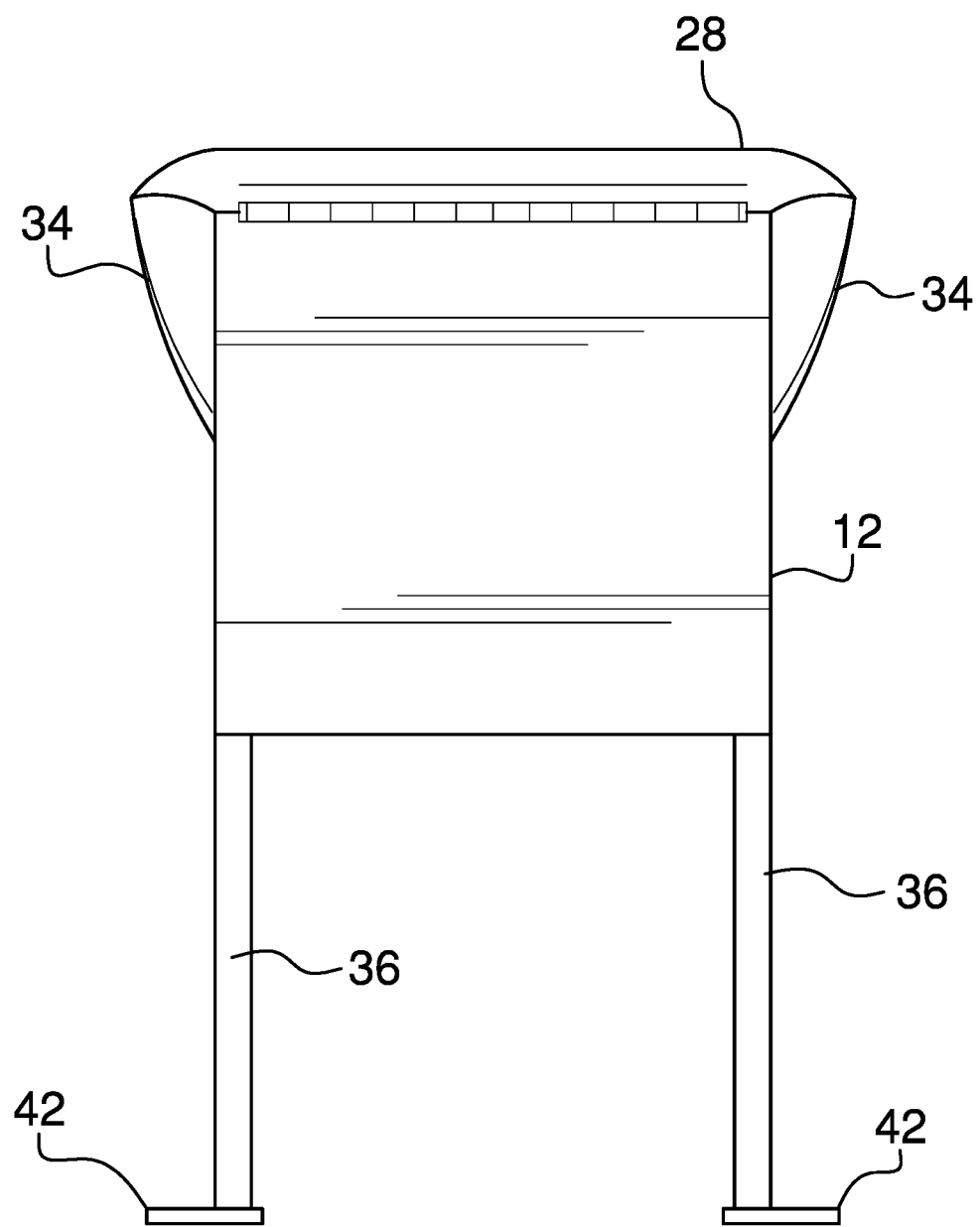
FIG. 4 is a back view of a drop box of an embodiment of the disclosure.
Figure 5:
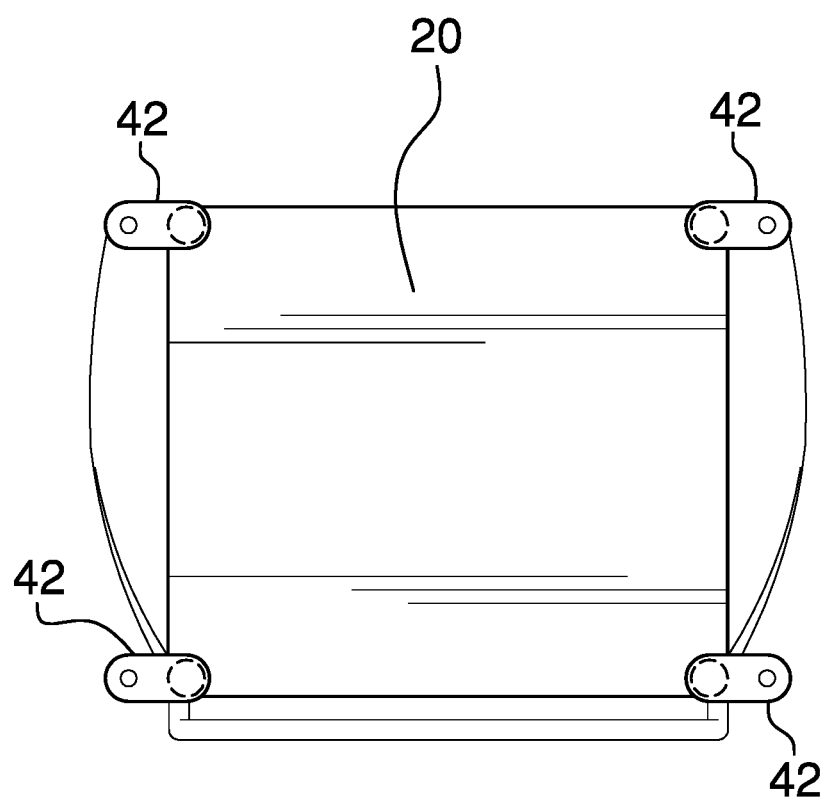
FIG. 5 is a bottom view of a drop box of an embodiment of the disclosure.
Figure 6:
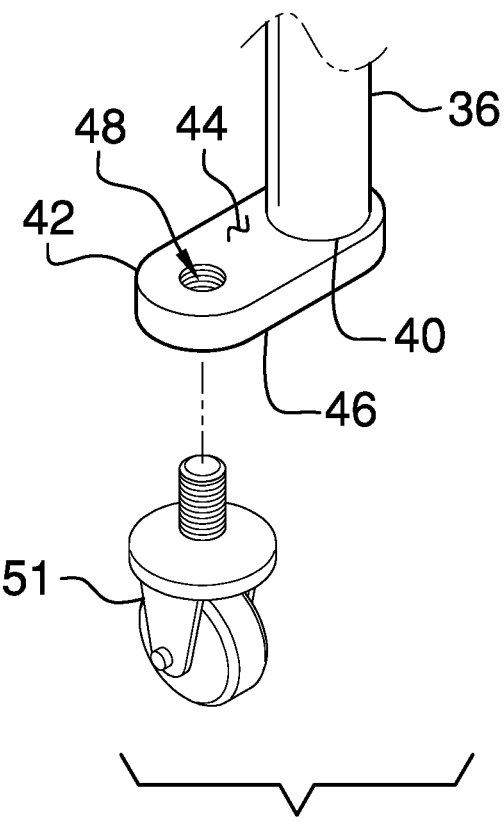
FIG. 6 is an exploded perspective view of an embodiment of the disclosure showing a roller being attached to a foot.
Figure 7:
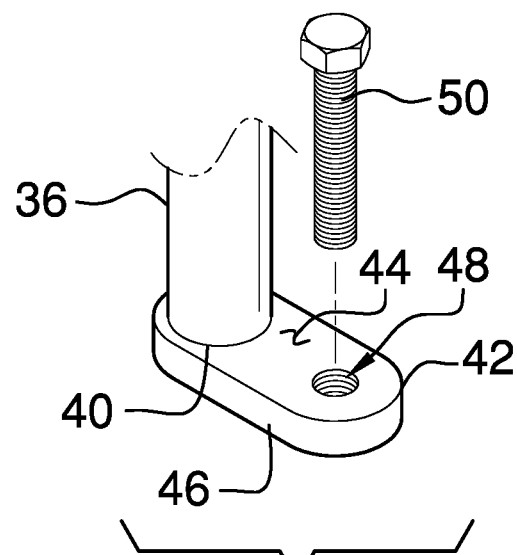
FIG. 7 is an exploded perspective view of a fastener being extended through a foot of an embodiment of the disclosure.

With reference now to the drawings, and in particular to FIGS. 1 through 9 thereof, a new security device embodying the principles and concepts of an embodiment of the disclosure and generally designated by the reference numeral 10 will be described.

As best illustrated in FIGS. 1 through 9, the school security assembly 10 generally comprises a drop box 12 that is positionable adjacent to an entrance 14 of a public building 16 to receive an object 18 to be delivered to a recipient inside the public building 16. The drop box 12 may be comprised of a translucent material to facilitate the object 18 to be visible in the drop box 12. The public building 16 may be a public school, a business or any other type of public building with multiple occupants. The object 18 to be delivered may be any object that the recipient in the building has forgotten, such as text book that a student forgot.

The drop box 12 has a bottom wall 20 and an outer wall 22 extending upwardly therefrom. The outer wall 22 has a distal edge 24 with respect to the bottom wall 20 to define an opening 26 into the drop box 12 to receive the object 18 intended to be delivered to the recipient inside the public building 16. The outer wall 22 has a first lateral side 21 and a second lateral side 23, and each of the first lateral side 21 and the second lateral side 23 may each have a plurality of air holes 25 extending therethrough.

A lid 28 is hingedly coupled to the drop box 12 for opening and closing the drop box 12. The lid 28 has a lower edge 30, a forward wall 31 a first lateral wall 32 and a second lateral wall 33. The lower edge 30 rests on the distal edge 24 of the outer wall 22 of the drop box 12 when the lid 28 is closed. Additionally, the lower edge 30 is spaced from the distal edge 24 when the lid 28 is opened. The lid 28 has a pair of wings 34 which each extends laterally away from a respective one of the first lateral wall 32 and the second lateral wall 33 of the lid. A handle 35 is coupled to the forward wall 31 of the lid 28 for gripping by a user to open and close the lid 28.

A plurality of legs 36 is provided and each of the legs 36 is coupled to and extends downwardly from the drop box 12 where to support the drop box 12 above a support surface 38. Each of the legs 36 is positioned on the bottom wall 20 of the drop box 12 and each of the legs 36 has a distal end 40 with respect to the bottom wall 20. A plurality of feet 42 is each coupled to the distal end 40 of a respective one of the legs 36 and each of the feet 42 is oriented perpendicular to the respective leg 36. Each of the feet 42 has a top surface 44 and a bottom surface 46, and the top surface 44 is coupled to the distal end 40 of the respective leg 36. In this way the bottom surface 46 of each of the feet 42 rests on the support surface 38.

Each of the feet 42 has an aperture 48 extending thorough the top surface 44 and the bottom surface 46. A plurality of fasteners 50 is provided and each of the fasteners 50 is extendable through the aperture 48 in a respective one of the feet 42. In this way each of the fasteners 50 can engage the support surface 38 for attaching the feet 42 to the support surface 38. Each of the fasteners 50 may comprise a bolt or other type of releasable fastener. As is most clearly shown in FIG. 6, a roller 51 can be attached to each of the feet 42 for rolling the drop box 12 along the support surface 38.

A communication unit 52 is provided and the communication unit 52 is positioned adjacent to the drop box 12. The communication unit 52 is in communication with the person when the person approached the drop box 12. Additionally, the communication unit 52 is in communication with a surveillance station 54 in the public building 16 to facilitate the person to communicate with an authorized representative in the public building 16. The communication unit 52 comprises a housing 56 that is positioned adjacent to the drop box 12, and the housing 56 has a front face 58 that is directed toward the drop box 12.

The communication unit 52 includes a video camera 60 that is coupled to the housing 56 to capture imagery of a person approaching the drop box 12. The video camera 60 is in communication with a surveillance station 54 inside the public building 16. In this way the video camera 60 facilitates the authorized representative in the public building 16 to visually identify the person approaching the drop box 12. The video camera 60 is positioned on the front face 58 of the housing 56 and the video camera 60 is electrically coupled to a power supply 62 comprising an electrical system of the public building 16.

The communication unit 52 includes a call button 64 that is movably coupled to the housing 56 thereby facilitating the call button 64 to be depressed by a user. The call button 64 is electrically coupled to the surveillance station 54 inside the public building 16 to facilitate the surveillance station 54 to emit an audible alert when the call button 64 is depressed. In this way the authorized user is notified that the person has approached the drop box 12.

The communication unit 52 includes a microphone 66 is coupled to the housing 56 to detect words spoken by the user. The microphone 66 is electrically coupled to the surveillance station 54 to facilitate the authorized user to hear the person. The communication unit 52 includes a speaker 68 that is coupled to the housing 56 to emit audible sounds outwardly therefrom. The speaker 68 is electrically coupled to the surveillance station 54 to emit words spoken by the authorized user that can be heard by the person. In this way the authorized user can be instructed to deliver the object 18 in the drop box 12 to the recipient in the public building 16.

Figure 8:
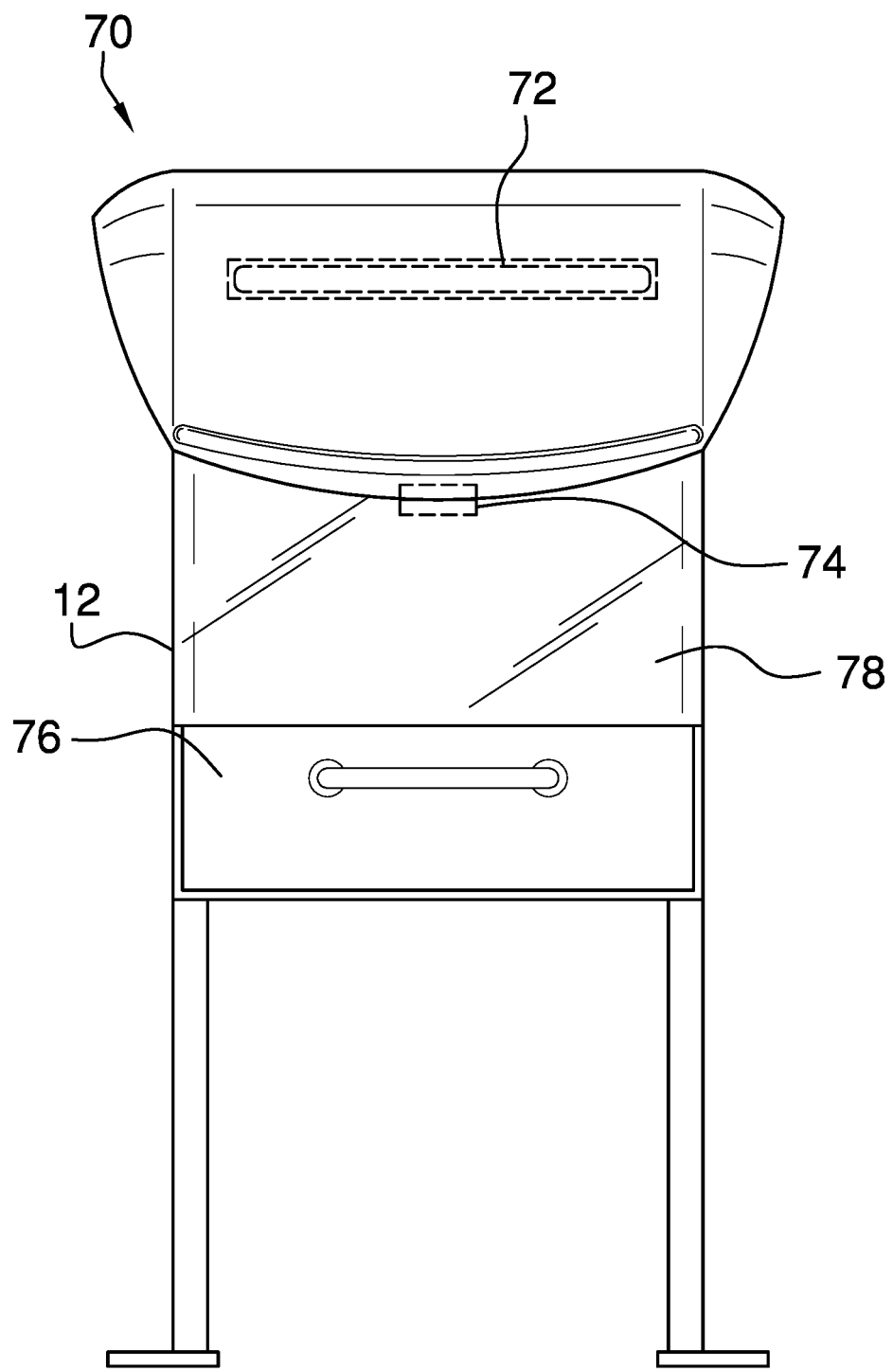
FIG. 8 is a front view of an alternative embodiment of the disclosure.
Figure 9:
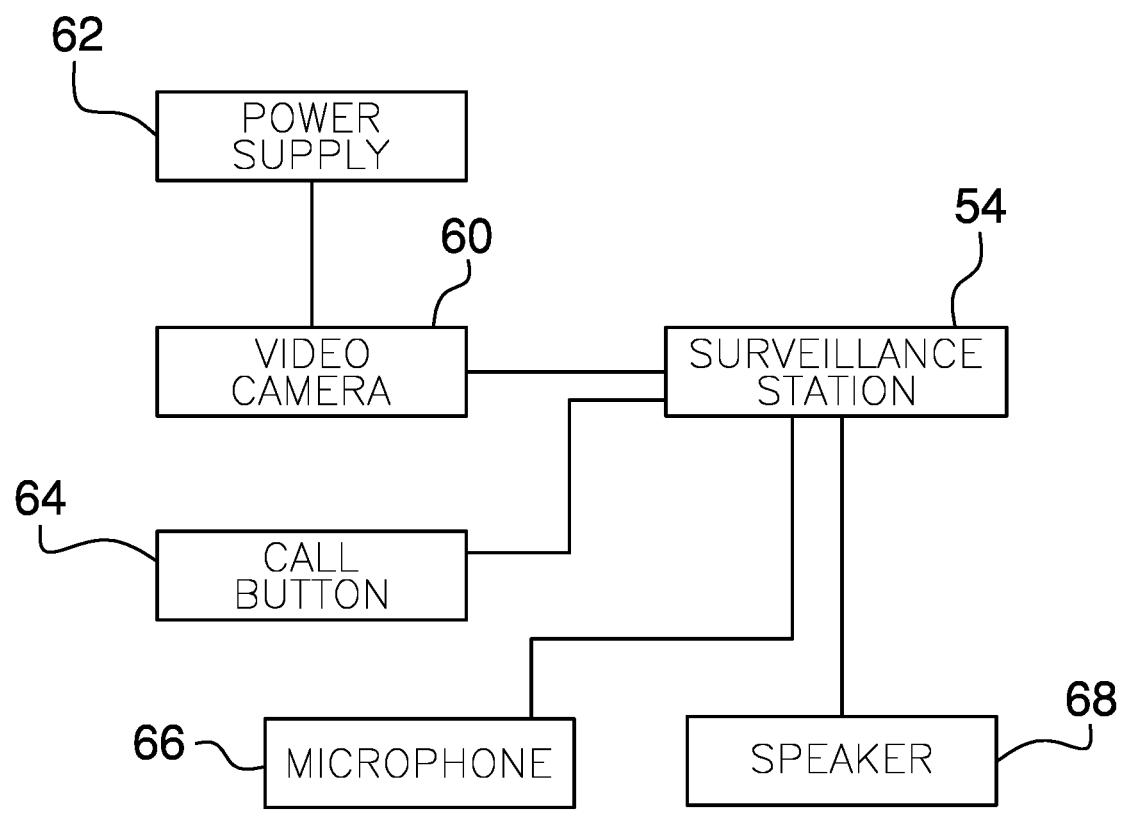
FIG. 9 is a schematic view of an embodiment of the disclosure.

In an alternative embodiment 70 as is most clearly shown in FIG. 8, a light emitter 72 is positioned in the drop box 12. The light emitter 72 emits electromagnetic radiation in the ultraviolet spectrum to sterilize an interior of the drop box 12 when the light emitter 72 is turned on. An electronic lock 74 is coupled to the drop box 12 and the electronic lock 74 engages the lid 28 when the electronic lock 74 is turned on for securing the object 18 in the drop box 12. A drawer 76 is slidably integrated into the drop box 12 and the drawer 76 is slidably outwardly from a front side 78 of the outer wall 22 of the drop box 12.

In use, the person approaches the drop box 12 and the person places the object 18 in the drop box 12. The person depresses the call button 64 to notify the authorized representative that the person has placed the object 18 in the drop box 12. Thus, the authorized representative can communicate with the person to find out the intended recipient for the object 18. The authorized representative exits the public building 16 to retrieve the object 18 from the drop box 12 and subsequently deliver the object 18 to the intended recipient. In this way the security of the public building 16 is not compromised by people entering the public building 16 to drop off the object 18, such as a parent entering a public school to drop off a text book that a student has forgotten.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A school security assembly for receiving an object being dropped off for a recipient in a school thereby facilitating the object to be retrieved by an authorized representative to exit and enter the school, said assembly comprising:
a drop box being positionable adjacent to an entrance of the school wherein said drop box is configured to receive the object to be delivered to the recipient inside the school, wherein said drop box has a bottom wall and an outer wall extending upwardly therefrom, a forward section of said outer wall having a height less than a height of a back section of said outer wall, said outer wall having a distal edge with respect to said bottom wall to define an opening into said drop box with angled sides extending up and rearwardly wherein said opening is configured to receive the object intended to be delivered to the recipient inside the school; a lid being hingedly coupled to said back section of said outer wall of said drop box for opening and closing said drop box, wherein said lid has a lower edge and a forward wall, said forward wall being aligned with said front section of said outer wall when said lid is closed, said lower edge resting on said distal edge of said outer wall of said drop box when said lid is closed, said lower edge being spaced from said distal edge when said lid is opened; a plurality of legs, each of said legs being coupled to and extending downwardly from said drop box wherein said plurality of legs is configured to support said drop box above a support surface; a communication unit being positioned adjacent to said drop box wherein said communication unit is configured to be in communication with a person when the person approaches said drop box and places the object in said drop box, said communication unit being in communication with a surveillance station in the school wherein said communication unit is configured to facilitate the person to communicate with the authorized representative in the school; wherein said communication unit comprises a housing being positioned adjacent to said drop box, said housing having a front face being directed toward said drop box; and wherein said communication unit includes a call button being movably coupled to said housing wherein said call button is configured to be depressed by the person, said call button being electrically coupled to the surveillance station inside the building wherein said call button is configured to facilitate the surveillance station to emit an audible alert when said call button is depressed to notify the authorized representative that the person has approached the drop box.

2. The assembly according to claim 1, wherein each of said legs is positioned on said bottom wall of said drop box, each of said legs having a distal end with respect to said bottom wall.

3. The assembly according to claim 2, further comprising a plurality of feet, each of said feet being coupled to said distal end of a respective one of said legs, each of said feet being oriented perpendicular to said respective leg, each of said feet having a top surface and a bottom surface, said top surface being coupled to said distal end of said respective leg wherein said bottom surface of each of said feet is configured to rest on the support surface, each of said feet having an aperture extending through said top surface and said bottom surface.

4. The assembly according to claim 3, further comprising a plurality of fasteners, each of said fasteners being extendable through said aperture in a respective one of said feet wherein each of said fasteners is configured to engage the support surface for attaching said feet to the support surface.

5. The assembly according to claim 1 wherein said communication unit includes a video camera being coupled to said housing wherein said video camera is configured to capture imagery of the person approaching said drop box, said video camera being in communication with a surveillance station inside the school wherein said video camera is configured to facilitate the authorized representative in the school to visually identify the person approaching said drop box, said video camera being positioned on said front face of said housing, said video camera being electrically coupled to a power supply comprising an electrical system of the school.

6. The assembly according to claim 1 wherein said communication unit includes a microphone being coupled to said housing wherein said microphone is configured to detect words spoken by the person, said microphone being electrically coupled to the surveillance station wherein said microphone is configured to facilitate the authorized representative to hear the person.

7. A school security assembly for receiving an object being dropped off for a recipient in a school thereby facilitating the object to be retrieved by an authorized representative to exit and enter the school, said assembly comprising: a drop box being positionable adjacent to an entrance of the school wherein said drop box is configured to receive an object to be delivered to the recipient inside the school, wherein said drop box has a bottom wall and an outer wall extending upwardly therefrom, a forward section of said outer wall having a height less than a height of a back section of said outer wall, said outer wall having a distal edge with respect to said bottom wall to define an opening into said drop box with angled sides extending up and rearwardly wherein said opening is configured to receive the object intended to be delivered to the recipient inside the school; a lid being hingedly coupled to said back section of said outer wall of said drop box for opening and closing said drop box, wherein said lid has a lower edge and a forward wall, said forward wall being aligned with said front section of said outer wall when said lid is closed, said lower edge resting on said distal edge of said outer wall of said drop box when said lid is closed, said lower edge being spaced from said distal edge when said lid is opened; a plurality of legs, each of said legs being coupled to and extending downwardly from said drop box wherein said plurality of legs is configured to support said drop box above a support surface; a communication unit being positioned adjacent to said drop box wherein said communication unit is configured to be in communication with a person when the person approaches said drop box and places the object in said drop box, said communication unit being in communication with a surveillance station in the school wherein said communication unit is configured to facilitate the person to communicate with the authorized representative in the school; wherein said communication unit comprises a housing being positioned adjacent to said drop box, said housing having a front face being directed toward said drop box; and wherein said communication unit includes a speaker being coupled to said housing wherein said speaker is configured to emit audible sounds outwardly therefrom, said speaker being electrically coupled to the surveillance station wherein said speaker is configured to emit words spoken by the authorized representative to be heard by the person thereby facilitating the authorized representative to deliver the object in the drop box to the recipient in the school.

8. A school security assembly for receiving an object being dropped off for a recipient in a school thereby facilitating the object to be retrieved by an authorized representative to exit and enter the school, said assembly comprising: a drop box being positionable adjacent to an entrance of the school wherein said drop box is configured to receive the object to be delivered to the recipient inside the school, said drop box having a bottom wall and an outer wall extending upwardly therefrom, a forward section of said outer wall having a height less than a height of a back section of said outer wall, said outer wall having a distal edge with respect to said bottom wall to define an opening into said drop box with angled sides extending up and rearwardly wherein said opening is configured to receive the object intended to be delivered to the recipient inside the school; a lid being hingedly coupled to said back section of said outer wall of said drop box for opening and closing said drop box, said lid having a lower edge and a forward wall, said forward wall being aligned with said front section of said outer wall when said lid is closed, said lower edge resting on said distal edge of said outer wall of said drop box when said lid is closed, said lower edge being spaced from said distal edge when said lid is opened; a handle being coupled to said forward wall of said lid wherein said handle is configured to be gripped by a person for opening and closing said lid; a plurality of legs, each of said legs being coupled to and extending downwardly from said drop box wherein said plurality of legs is configured to support said drop box above a support surface, each of said legs being positioned on said bottom wall of said drop box, each of said legs having a distal end with respect to said bottom wall; a plurality of feet, each of said feet being coupled to said distal end of a respective one of said legs, each of said feet being oriented perpendicular to said respective leg, each of said feet having a top surface and a bottom surface, said top surface being coupled to said distal end of said respective leg wherein said bottom surface of each of said feet is configured to rest on the support surface, each of said feet having an aperture extending through said top surface and said bottom surface; a plurality of fasteners, each of said fasteners being extendable through said aperture in a respective one of said feet wherein each of said fasteners is configured to engage the support surface for attaching said feet to the support surface; a communication unit being positioned adjacent to said drop box wherein said communication unit is configured to be in communication with the person when the person approaches said drop box and places the object in said drop box, said communication unit being in communication with a surveillance station in the school wherein said communication unit is configured to facilitate the person to communicate with the authorized representative in the school, said communication unit comprising: a housing being positioned adjacent to said drop box, said housing having a front face being directed toward said drop box; a video camera being coupled to said housing wherein said video camera is configured to capture imagery of the person approaching said drop box, said video camera being in communication with the surveillance station inside the school wherein said video camera is configured to facilitate the authorized representative in the school to visually identify the person approaching said drop box, said video camera being positioned on said front face of said housing, said video camera being electrically coupled to a power supply comprising an electrical system of the school; a call button being movably coupled to said housing wherein said call button is configured to be depressed by the person, said call button being electrically coupled to the surveillance station inside the building wherein said call button is configured to facilitate the surveillance station to emit an audible alert when said call button is depressed to notify the authorized representative that the person has approached the drop box; a microphone being coupled to said housing wherein said microphone is configured to detect words spoken by the person, said microphone being electrically coupled to the surveillance station wherein said microphone is configured to facilitate the authorized representative to hear the person; and a speaker being coupled to said housing wherein said speaker is configured to emit audible sounds outwardly therefrom, said speaker being electrically coupled to the surveillance station wherein said speaker is configured to emit words spoken by the authorized representative to be heard by the person thereby facilitating the authorized representative to deliver the object in the drop box to the recipient in the school.

9. The assembly according to claim 8, further comprising a light emitter being positioned in said drop box, said light emitter emitting electromagnetic radiation in the ultraviolet spectrum wherein said light emitter is configured to sterilize an interior of said drop box when said light emitter is turned on.

10. The assembly according to claim 8, further comprising an electronic lock being coupled to said drop box, said electronic lock engaging said lid when said electronic lock is turned on for securing the object in said drop box.

11. The assembly according to claim 8, further comprising a drawer being slidably integrated into said drop box, said drawer being slidable outwardly from a front side of said outer wall of said drop box.

\* \* \* \* \*